(12) United States Patent
Giforos et al.

(10) Patent No.: US 9,552,491 B1
(45) Date of Patent: Jan. 24, 2017

(54) SYSTEMS AND METHODS FOR SECURING DATA

(75) Inventors: Petros George Giforos, American Fork, UT (US); Plinio Pimentel, Highland, UT (US)

(73) Assignee: Crimson Corporation, Dover, DE (US)

( * ) Notice: Subject to any disclaimer, the term of this patent is extended or adjusted under 35 U.S.C. 154(b) by 1036 days.

(21) Appl. No.: 12/327,668

(22) Filed: Dec. 3, 2008

Related U.S. Application Data

(60) Provisional application No. 60/992,262, filed on Dec. 4, 2007.

(51) Int. Cl.
*G06F 17/00* (2006.01)
*G06F 21/62* (2013.01)
*G06F 21/10* (2013.01)
*G06F 21/78* (2013.01)
*H04L 29/06* (2006.01)

(52) U.S. Cl.
CPC ........... *G06F 21/6218* (2013.01); *G06F 21/10* (2013.01); *G06F 21/78* (2013.01); *H04L 2209/80* (2013.01)

(58) Field of Classification Search
CPC .... G06F 21/62; G06F 21/604; G06F 21/6218; G06F 21/10; G06F 21/305; G06F 21/78; G06F 2221/2127; G06F 2221/2141
USPC ...................................... 726/1, 4, 17, 22, 24
See application file for complete search history.

(56) References Cited

U.S. PATENT DOCUMENTS

| 6,070,244 A * | 5/2000 | Orchier ............... G06F 21/6218 709/223 |
| 7,325,097 B1 * | 1/2008 | Darcy ........................... 711/117 |
| 7,769,394 B1 * | 8/2010 | Zhu ............................ 455/456.1 |
| 7,895,666 B1 * | 2/2011 | Eshghi et al. .................. 726/30 |
| 2002/0095572 A1 * | 7/2002 | Frank et al. ................... 713/166 |
| 2004/0083367 A1 * | 4/2004 | Garg et al. .................... 713/170 |
| 2004/0117310 A1 * | 6/2004 | Mendez .................. G06F 21/62 705/50 |
| 2005/0028006 A1 * | 2/2005 | Leser et al. .................... 713/200 |
| 2005/0066165 A1 * | 3/2005 | Peled et al. ................... 713/165 |
| 2005/0172144 A1 * | 8/2005 | Shao ............................ 713/200 |
| 2005/0188208 A1 * | 8/2005 | Day et al. ..................... 713/182 |
| 2005/0193103 A1 * | 9/2005 | Drabik ............... H04L 63/0272 709/221 |
| 2006/0037068 A1 * | 2/2006 | Hollberg ........................... 726/7 |
| 2006/0048224 A1 * | 3/2006 | Duncan et al. ................. 726/22 |
| 2006/0080667 A1 * | 4/2006 | Sanghvi et al. ............. 719/310 |
| 2006/0167858 A1 * | 7/2006 | Dennis et al. .................... 707/3 |

(Continued)

OTHER PUBLICATIONS

"Faronics Deep Freeze," http://www.faronics.com/html/Deepfreeze.asp, Dec. 3, 2008.

(Continued)

*Primary Examiner* — Ashok Patel
*Assistant Examiner* — Gary Gracia
(74) *Attorney, Agent, or Firm* — Austin Rapp & Hardman

(57) ABSTRACT

Systems and methods for securing data are disclosed. An administrative system may create a secure configuration. The secure configuration may disable functionality of a managed node that compromises sensitive data. However, the secure configuration may not prevent all user access to the managed node. The administrative system may deploy the secure configuration to at least one managed node. The administrative system may cause the secure configuration to be applied to the at least one managed node.

14 Claims, 8 Drawing Sheets

(56) References Cited

U.S. PATENT DOCUMENTS

| | | | |
|---|---|---|---|
| 2006/0206507 A1* | 9/2006 | Dahbour | 707/100 |
| 2006/0259967 A1* | 11/2006 | Thomas et al. | 726/22 |
| 2006/0265760 A1* | 11/2006 | Daemke | G06F 21/604 |
| | | | 726/27 |
| 2006/0282876 A1* | 12/2006 | Shelest | G06F 21/6218 |
| | | | 726/1 |
| 2007/0016958 A1* | 1/2007 | Bodepudi et al. | 726/27 |
| 2007/0124792 A1* | 5/2007 | Bennett et al. | 725/133 |
| 2007/0169171 A1* | 7/2007 | Kumar et al. | 726/2 |
| 2007/0179802 A1* | 8/2007 | Buss et al. | 705/1 |
| 2007/0180490 A1* | 8/2007 | Renzi et al. | 726/1 |
| 2007/0245026 A1* | 10/2007 | Martin et al. | 709/227 |
| 2007/0289012 A1* | 12/2007 | Baird | H04L 9/321 |
| | | | 726/17 |
| 2008/0059743 A1* | 3/2008 | Bychkov | G06F 21/305 |
| | | | 711/163 |
| 2008/0071805 A1* | 3/2008 | Mourra et al. | 707/100 |
| 2008/0104661 A1* | 5/2008 | Levin et al. | 726/1 |
| 2008/0114790 A1* | 5/2008 | Hall et al. | 707/100 |
| 2008/0126349 A1* | 5/2008 | Venkatraman et al. | 707/8 |
| 2008/0222663 A1* | 9/2008 | Carpenter et al. | 719/328 |
| 2008/0244134 A1* | 10/2008 | Hosomi et al. | 710/200 |
| 2008/0256635 A1* | 10/2008 | Gassoway | 726/24 |
| 2008/0271109 A1* | 10/2008 | Singh et al. | 726/1 |
| 2008/0301760 A1* | 12/2008 | Lim | 726/1 |
| 2008/0307523 A1* | 12/2008 | Subramanyam et al. | 726/21 |
| 2009/0025063 A1* | 1/2009 | Thomas | 726/4 |
| 2009/0043786 A1* | 2/2009 | Schmidt et al. | 707/100 |
| 2009/0049174 A1* | 2/2009 | Rudnik | 709/226 |
| 2009/0063685 A1* | 3/2009 | Common | 709/227 |
| 2009/0097660 A1* | 4/2009 | Malaviarachchi et al. | 380/279 |

OTHER PUBLICATIONS

"Faronics Deep Freeze Enterprise User Guide," http://www.faronics.com/doc/DF6Ent_Manual.pdf, Dec. 3, 2008.

"Faronics Deep Freeze Standard User Guide," http://www.faronics.com/doc/DF6Std_Manual.pdf, Dec. 3, 2008.

* cited by examiner

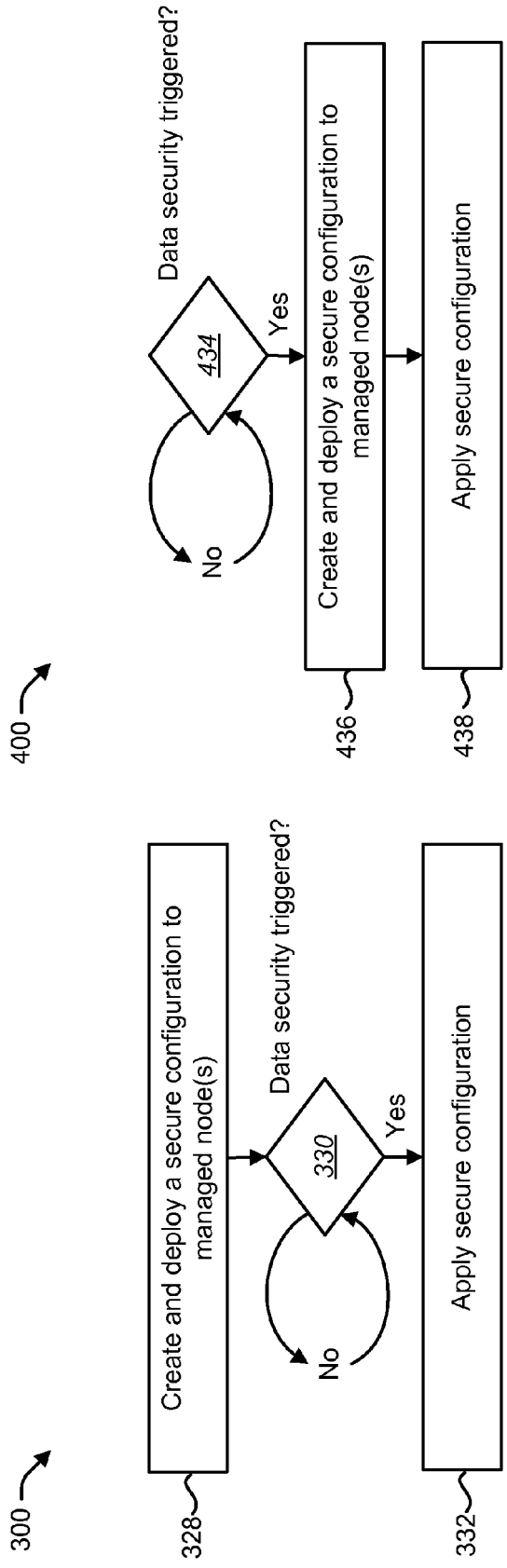

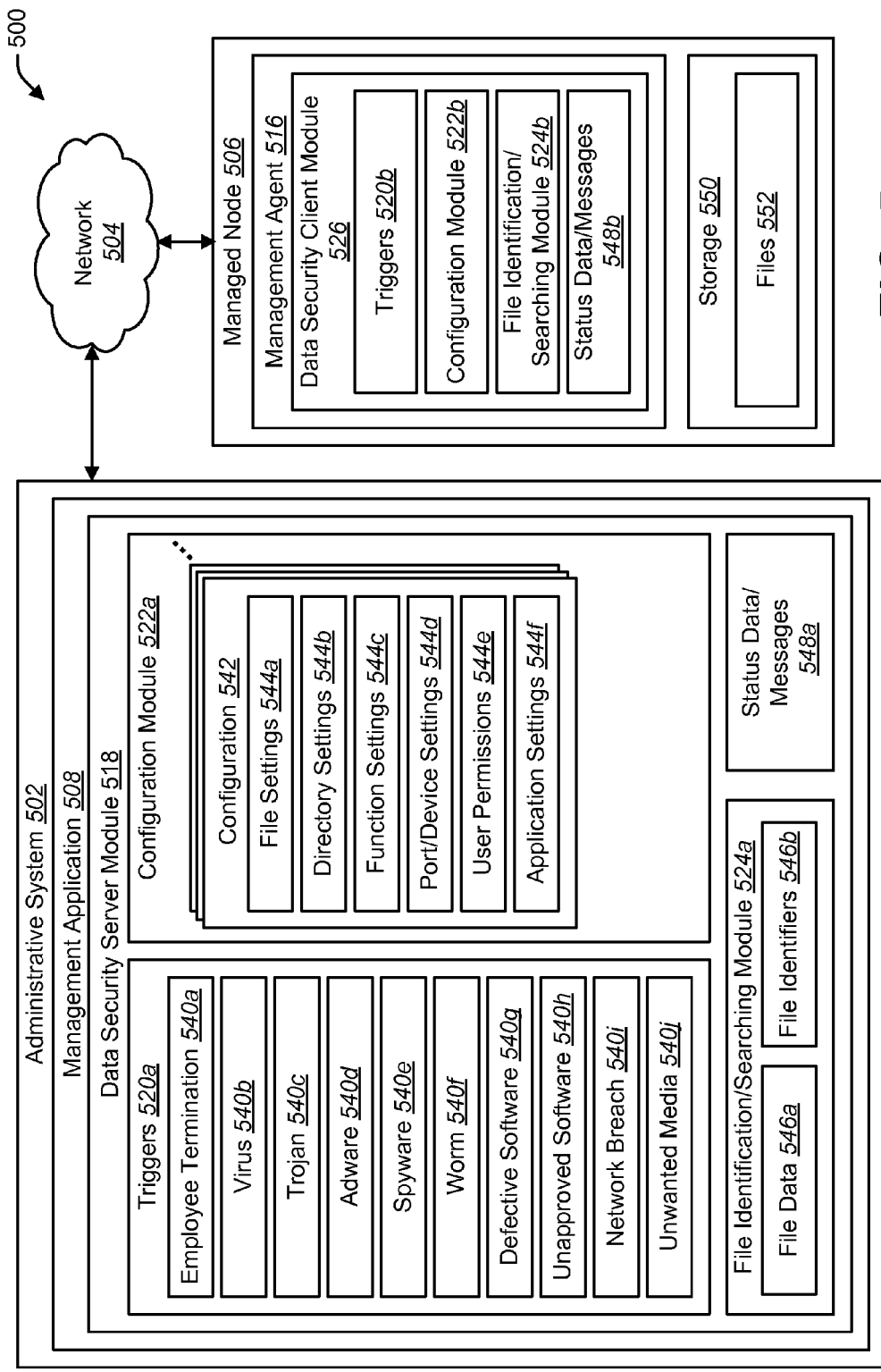

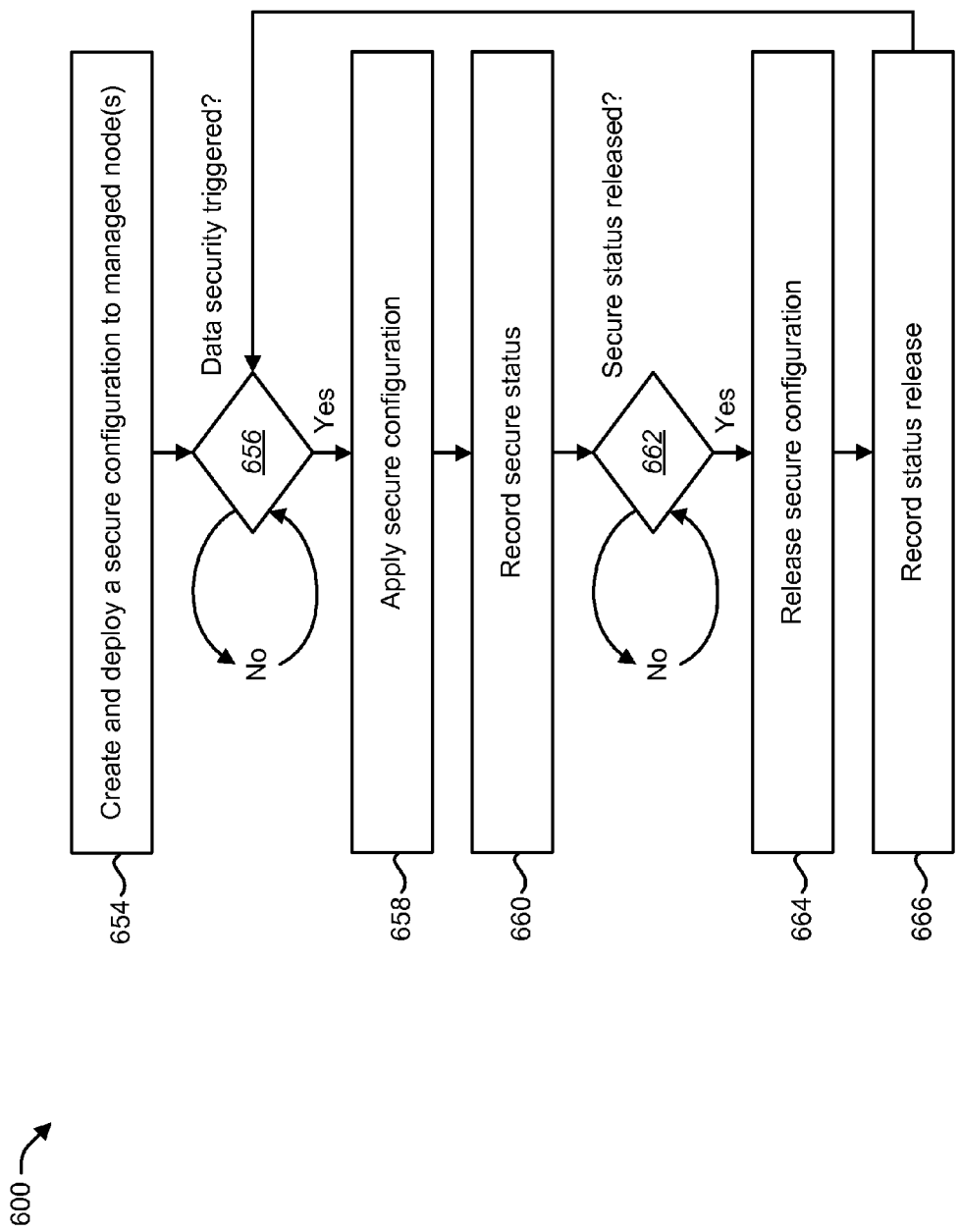

SYSTEMS AND METHODS FOR SECURING DATA

RELATED APPLICATIONS

This application claims the benefit of U.S. Provisional Patent Application Ser. No. 60/992,262, entitled "Systems and Methods for Remotely Securing a Computing Device's Data so that the Data Can Be Viewed But Cannot Be Deleted, or Formatted or Copied to External Devices," which was filed Dec. 4, 2007, which is expressly incorporated herein by this reference.

TECHNICAL FIELD

The present disclosure relates generally to computers and computer-related technology. More specifically, the present disclosure relates to systems and methods for securing data.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. These computers are often interconnected to form a computer network. One or more servers may provide data, services and/or may be responsible for managing other computers on a network. The managed computers are often referred to as nodes. A computer network may have hundreds or even thousands of managed nodes.

Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly, computer software is also frequently upgraded or replaced. New computer hardware and software is continually being integrated into systems across the world.

As corporate performance and end-user productivity have become increasingly dependent on computers, computer support personnel are continuously under pressure to accomplish more with existing or reduced staff head counts. They are also under pressure to perform tasks as efficiently as possible, which may include minimizing effects to existing computer systems and networks.

Further, computers on a managed network, including laptop computers, are increasingly utilized to store sensitive and confidential information. If a managed computer's security is compromised, the risk of disclosure of confidential or sensitive information is significant. Current systems for managing computer networks and for protecting sensitive information on a managed network or on computer systems have limitations.

As shown from the above discussion, there is a need for systems and methods that will improve the ability to manage and support computer systems and that will limit the disclosure of confidential information stored on a computer system or network. Improved systems and methods may enable a person performing computer support to work more efficiently and accomplish more in less time and to also limit the disclosure of confidential or sensitive information stored on a computer system or network.

BRIEF DESCRIPTION OF THE DRAWINGS

FIG. 3 is a flow diagram that illustrates one configuration of a method for securing data;

FIG. 4 is a flow diagram that illustrates another configuration of a method for securing data;

FIG. 5 is a block diagram that illustrates another configuration of a system for securing data;

FIG. 6 is a flow diagram that illustrates another configuration of a method for securing data;

DETAILED DESCRIPTION

Figure 1:
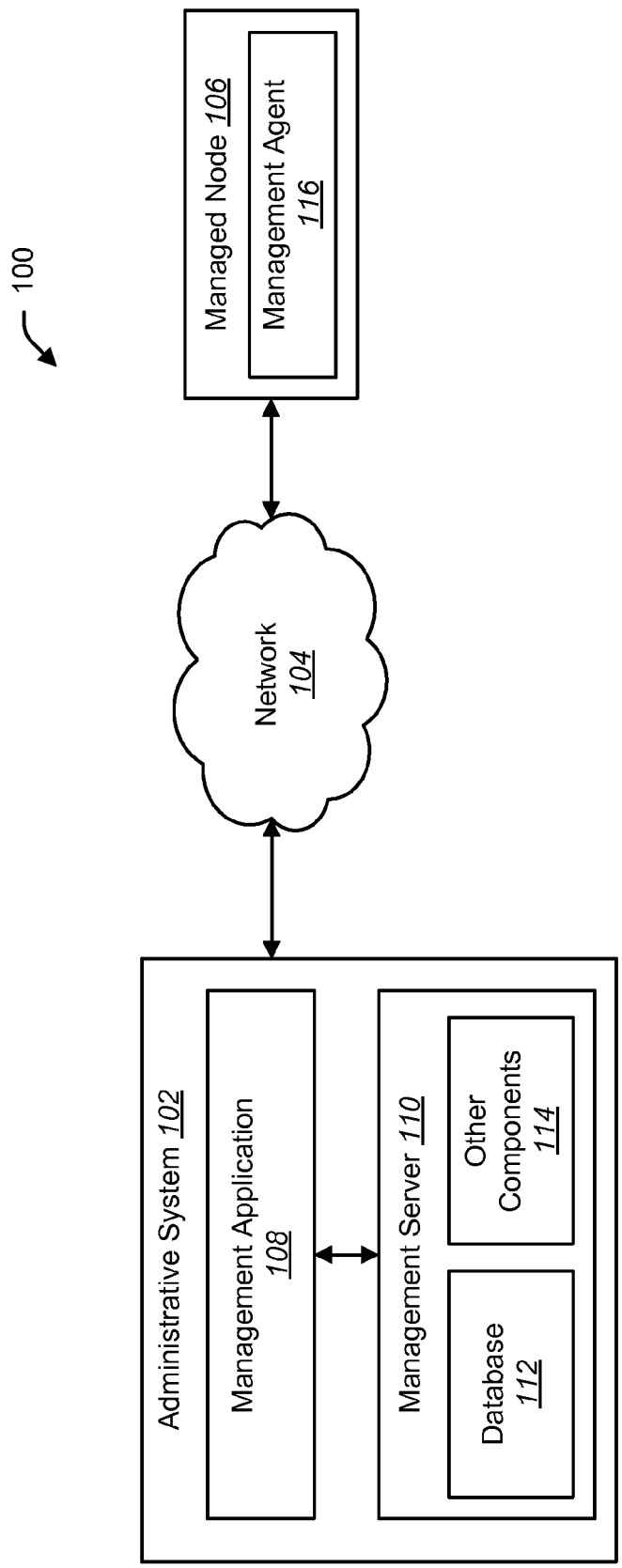
FIG. 1 is a block diagram that illustrates one configuration of a managed network in which a system for securing data may be implemented.

A method for securing data is disclosed. A secure configuration is created. The secure configuration disables functionality of a managed node that compromises sensitive data but does not prevent all user access to the managed node. The secure configuration is deployed to at least one managed node. The secure configuration is caused to be applied to the at least one managed node.

The secure configuration may provide a user of the managed node with read-only access to the managed node. The secure configuration may change settings of the at least one managed node when the secure configuration is applied to the at least one managed node. The settings may include at least one of file settings, directory settings, function settings, port/device settings and application settings. In addition, the secure configuration may change user permissions of the at least one managed node when the secure configuration is applied to the at least one managed node. Moreover, the secure configuration may not prevent write operations performed by an operating system of the managed node.

The functionality of the managed node that is disabled by the secure configuration may include at least one of modifying, deleting, renaming, transferring and copying the sensitive data. The sensitive data may be searched for and identified on the at least one managed node.

The method may be implemented by an administrative system. Causing the secure configuration to be applied to the at least one managed node may include instructing the at least one managed node to apply the secure configuration.

The at least one managed node may be monitored. An event may be detected that makes securing node data desirable. Causing the secure configuration to be applied to the at least one managed node may be performed automatically in response to detecting the event.

Causing the secure configuration to be applied to the at least one managed node may be performed manually in response to user input.

An event may be detected that indicates that the secure configuration is no longer necessary. The secure configuration may then be released from the at least one managed node.

A status message may be received from each managed node to which the secure configuration has been applied.

An administrative system that is configured for securing data is disclosed. The administrative system includes a processor and memory in electronic communication with the processor. Executable instructions are stored in the memory. A secure configuration is created. The secure configuration disables functionality of a managed node that compromises sensitive data but does not prevent all user access to the managed node. The secure configuration is deployed to at least one managed node. The secure configuration is caused to be applied to the at least one managed node.

A computer-readable medium for securing data is disclosed. The computer-readable medium comprises executable instructions. A secure configuration is created. The secure configuration disables functionality of a managed node that compromises sensitive data but does not prevent all user access to the managed node. The secure configuration is deployed to at least one managed node. The secure configuration is caused to be applied to the at least one managed node.

Methods and systems for securing data are disclosed. An administrative system may manage nodes over a network. The administrative system may monitor the managed nodes for certain events to occur. When a certain event(s) occurs, it may be desirable to secure some or all of the data stored on the managed node(s). For example, if the user of a managed node is an employee who has been or will be terminated, it may be desirable to secure the data on that managed node to prevent the employee from modifying, copying, transferring, or destroying sensitive data. Another example would be if a malicious virus were detected on the system, or any other situation where sensitive data may be compromised. It may be desirable to maintain operability of the managed node, however, without entirely freezing or locking the managed node (i.e., without preventing all user access to the managed node). While a full lock or freeze is possible with the systems and methods disclosed herein, one advantage is that differing levels of data security may be created, deployed, and applied while maintaining system operability and current data.

These data security levels may be achieved by creating, deploying, and applying secure configurations. A secure configuration may be created that prohibits or disables node functionality that could compromise sensitive data. For example, a configuration may be created, deployed, and applied that provides read-only access to a user of the managed node. A configuration may disable creating, modifying, deleting, renaming, transferring (locally, over a network, or to an external device), copying or otherwise compromising sensitive data. This may be accomplished by changing node software and hardware settings, as well as using other software to prevent particular functions from being successfully executed.

These configurations may be created, deployed, and/or applied remotely over a network or locally on the managed node(s). Event monitoring may also occur remotely or locally.

Several configuration examples are now described with reference to the Figures. This detailed description of several configuration examples, as illustrated in the Figures, is not intended to limit the scope of the claimed invention.

FIG. 1 is a block diagram that illustrates one configuration of a managed network in which a system 100 for securing data may be implemented. An administrative system 102 is connected to a computer network 104, such as a corporate Local Area Network (LAN). The administrative system 102 is used to manage node(s) 106 that are also connected to the computer network 104. These other node(s) 106 will be referred to herein as "managed nodes" or "nodes." For simplicity, only a single managed node 106 is shown in the system 100 of FIG. 1. Other configurations of the system 100, however, may include many managed nodes 106.

The administrative system 102 may include a management server 110. The management server 110 may include a database 112 of information. The management server 110 may also include various other components 114 that are configured to perform tasks such as scheduling, handling alerts, and so forth. An example of a management server 110 that may be used with configurations disclosed herein is the core server for the LANDesk® Management Suite (LDMS).

The administrative system 102 may include a management application 108. The management application 108 may be used to perform various tasks related to the management of the network 104, such as remote control features, software distribution, software license monitoring, operating system imaging and migration, IT asset management, data security, problem resolution, and acting as a gateway to the Internet or other networks for managed nodes 106. The computer network 104 may be an internal network or an external network (e.g. an intranet and/or the Internet). As used herein, an administrative system 102 "manages" a managed node 106 when it performs one or more management tasks with respect to the managed node 106.

As part of performing these tasks, the management application 108 may connect to the management server 110 and query the management server 110 to obtain information. An example of a management application 108 that may be used is the console application for the LANDesk® Management Suite. Although a management server 110 is shown in the system 100 depicted in FIG. 1, not all configurations may require a management server 110.

The managed node 106 may include a management agent 116. The management agent 116 may be a software application designed to perform management-related tasks. The management agent 116 may perform management-related tasks in response to requests from the management application 108. An example of a management agent 116 that may be used is the LANDesk® Management Agent.

As indicated, the configuration shown in FIG. 1 is merely illustrative. As shown, the system 100 includes only one managed node 106. Of course, the system 100 may include many managed nodes 106, networks 104, and/or subnets (e.g., a portion of an Internet Protocol (IP) network defined by a subnet mask).

Figure 2:
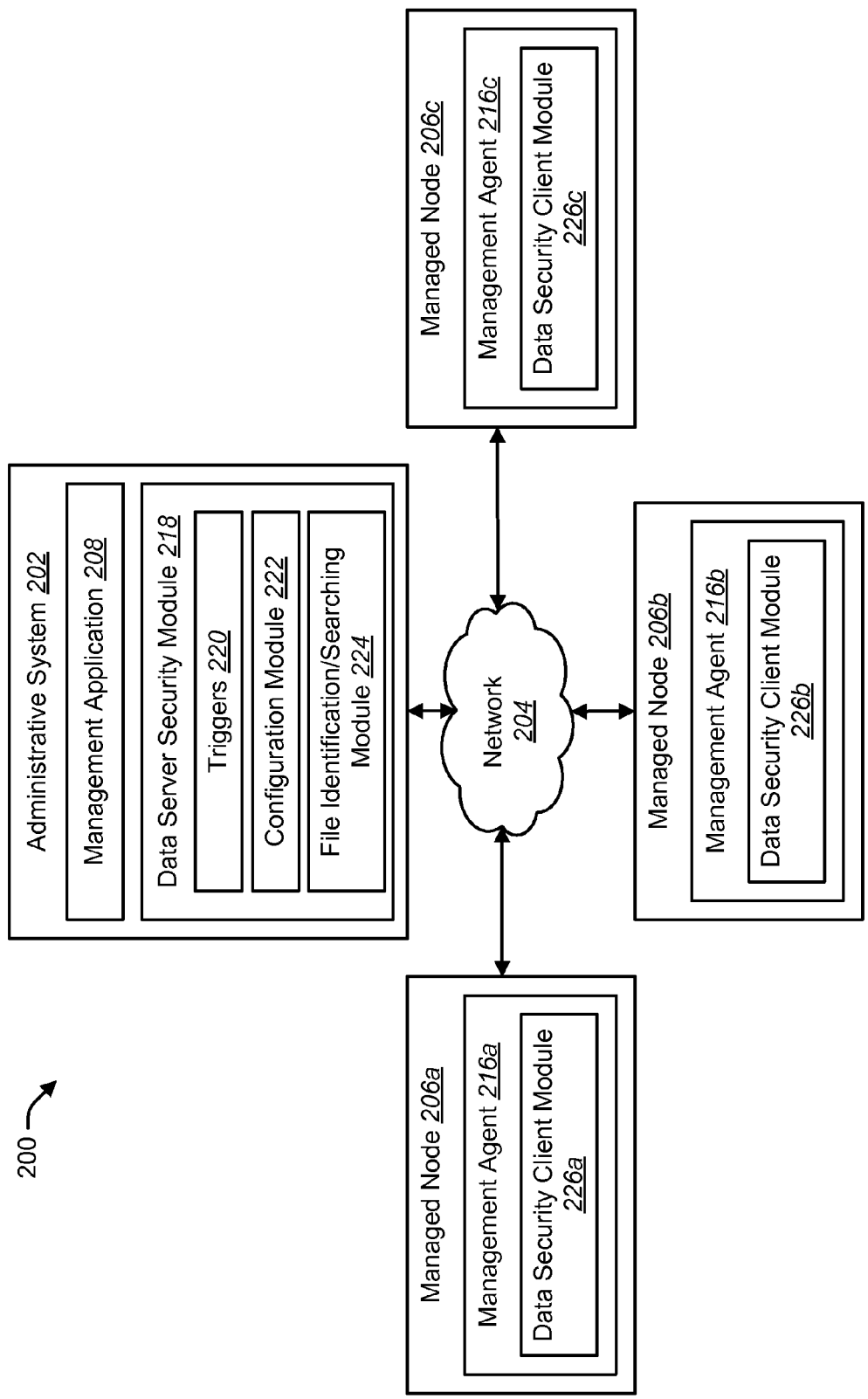
FIG. 2 is a block diagram that illustrates one configuration of a system for securing data.

FIG. 2 is a block diagram that illustrates one configuration of a system 200 for securing data. The system 200 may include an administrative system 202, a network 204, and managed nodes 206a, 206b, 206c, etc. The managed nodes 206a, 206b, 206c may each include a management agent 216a, 216b, 216c. Each management agent 216a, 216b, 216c may include a data security client module 226a, 226b, 226c. The administrative system 202 may communicate with and monitor condition(s) and/or event(s) occurring on the managed node(s) 206. The administrative system 202 may include a management application 208. The management application 208 may include a data security server module 218. The data security server module 218 may be software configured to manage and/or control security for data stored on managed nodes 206. The data security server module 218 may include triggers 220, a configuration module 222, and a file identification/searching module 224.

A trigger 220 may be software instructions designed to detect user interaction with the administrative system 202, or detect one or more conditions and to activate other software instructions in response. For example, the triggers 220 may detect that a user is attempting to delete, format, or alter data on one or more of the managed nodes 206. The triggers 220 may detect that a user is attempting to copy data from one or more managed nodes 206. The triggers 220 may detect that a user is attempting to copy or transfer data included on one or more managed nodes 206 to external memory such as an external hard drive, Universal Serial Bus (USB) drive, Compact Disc (CD), Digital Video Disc (DVD), Blu-Ray®, floppy disk, Secure Digital (SD) card, etc. The triggers 220 may detect that a user (or third party) is attempting to install malware (e.g., viruses, Trojan horses, worms, rootkits, spyware, adware, etc.), defective software, or other unwanted software on one or more managed nodes 206. The triggers 220 may detect that one or more managed nodes 206 has become or may become contaminated by malware, defective software, or other unwanted software through other means (e.g., through the Internet, intranet, internal or external drives/devices, etc.). The triggers 220 may detect a security breach (e.g., a third party has gained or may gain access to the managed nodes 206). The triggers 220 may detect an unwanted use of the managed node 206 (e.g., a user/third party is downloading pornography onto the managed node 206, a user/third party is using the managed node 206 to make unlawful/unwanted transactions). The triggers 220 may detect a change in user status (e.g., the user of a managed node 206 is/was an employee that has been or is in the process of being terminated, the user's privileges have been revoked, etc.). The triggers 220 may otherwise detect any event that may result in a damaging action by a user or any third party. Certain triggers 220 may correspond to certain system threats or manual interactions. The triggers 220 may be predefined and/or created as desired or needed.

The triggers 220 may interact with the configuration module 222 and/or file identification/searching module 224. The triggers 220 may interact with managed nodes 206, and in particular, with the data security client modules 226 within the management agents 216. The triggers 220 may send messages or instructions to one or more managed nodes 206, their management agents 216, and/or their data security client modules 226 over the network 204. The triggers 220 may send messages indicating that data on one or more managed nodes 206 should be secured (and/or released). The triggers 220 may send instructions indicating how to secure data (e.g., by indicating a particular configuration to apply) on one or more managed nodes 206. The triggers 220 may send instructions indicating which data should be secured on one or more managed nodes 206.

Triggers 220 may also be activated by a user of the administrative system. That is, a user of the administrative system (e.g., system administrator, IT professional, etc.) may activate the triggers 220 from the administrative system 202. For example, a system administrator at a corporation may activate the triggers 220 in response to information that the user of a managed node 206 is an employee that has been or will be terminated. A system administrator may activate the triggers 220, for example, in response to information that the user may be engaging in or may intend to engage in behavior that could destroy, transfer, or otherwise compromise data on one or more managed nodes 206.

Triggers 220 may thus be activated manually or automatically. For instance, a process designed to detect virus activity may automatically activate the triggers 220. On the other hand, a system administrator could manually activate the triggers 220 for any reason.

The configuration module 222 may create and/or deploy various configurations to one or more managed nodes 206 over a network 204 (e.g., to the data security client modules 226 within the management agents 216). The configuration module 222 may create and/or deploy configurations automatically, or may assist a user in creating and/or deploying configurations. The configuration module 222 may create "security" configurations intended for use on one or more managed nodes 206. These security configurations may comprise system settings, permissions, and/or software that provide read-only access to a user of the managed node 206. The security configurations may prevent a user from modifying, destroying, formatting, copying, transferring, altering, and/or otherwise compromising data on one or more managed nodes 206. For example, when a security configuration is applied to or activated on one or more managed nodes 206, the managed nodes 206 may behave in a secure mode. While in this secure mode, a user may be unable to rename files, create files, modify files, move files, copy files, delete files, encrypt files, format/encrypt/scramble a disk, copy/transfer files to external storage, copy/transfer files via system ports (e.g., Ethernet, IEEE 1394 such as FireWire® or i.Link®, USB, Infrared (IR), etc.), take screenshots, and/or otherwise compromise data. While in secure mode, a managed node 206 may or may not allow a user to view all or some files. While in secure mode, a managed node 206 may still allow writes from the Operating System (OS) in order to maintain operation. For example, on a machine using Microsoft Windows®, the machine may be set to a secure mode, but the OS could still write to the memory page file, thereby maintaining system operation. This procedure may allow a managed node's 206 state to be preserved without completely locking or freezing the computer. This may also allow for data security without having to revert to a previous known configuration.

The configuration module 222 may create configurations and deploy them to managed nodes 206 across a network 204 before any conditions arise where activation of the configurations may be desired or needed (e.g., a virus has contaminated a node or an employee is going to be terminated). Alternatively, or in addition, the configuration module 222 may create configurations and deploy them to managed nodes 206 across a network 204 at the time or after events or conditions arise where activation of the configurations is desired or needed. The configuration module 222 may interact with the file identification/searching module 224. The configuration module 222 may create various configurations with differing levels of security. These configurations may allow all, some, or no user operations. The selection, deployment, and activation of these configurations may depend on the amount or type of security desired or needed, the type of triggers 220 activated, the type of managed nodes 206, the identity of the user, and/or the selection of files where security is desired or needed.

The file identification/searching module 224 may search for and/or identify critical or sensitive files on one or more managed nodes 206. These files may include critical or sensitive information. The file identification/searching module 224 may designate all, some, or no files on one or more managed nodes 206 as critical or sensitive (e.g., where security is desired). This module 224 may maintain a list of critical or sensitive files stored on the managed nodes 206. This module 224 may also maintain certain criteria to distinguish critical/sensitive files from other files, such that a determination could be made in real time without any prior knowledge of the files. This module 224 may search for files before any conditions arise where security of the critical/sensitive files is desired or needed. This module 224 may also search for files at the time of or after one or more events or conditions have arisen where security of the critical/sensitive files is desired or needed.

Each management agent 216 may include a data security client module 226. A data security client module 226 may be software configured to manage and/or control security for data stored on managed nodes 206. A data security client module 226 may work in conjunction with and communicate with a data security server module 218. A data security client module 226 may also work independently. A data security client module 226 may receive, activate, and/or apply configurations to managed nodes 206 sent from the data security server module 218 over a network 204. These configurations may be security configurations as discussed earlier.

FIG. 3 is a flow diagram that illustrates one configuration of a method 300 for securing data. A configuration may be created and deployed 328 to one or more managed nodes 206. The configuration may be a security configuration. The managed nodes 206 may then be monitored 330 for one or more events and/or conditions to activate a trigger 220. If one or more events and/or conditions arise that activate a trigger 220, a configuration may be applied 332 to one or more managed nodes 206.

FIG. 4 is a flow diagram that illustrates another configuration of a method 400 for securing data. Managed nodes 206 may be monitored 434 for one or more events and/or conditions to activate a trigger 220. If one or more events and/or conditions arise that activate a trigger, a configuration may be created and deployed 436 to managed nodes 206. The configuration may be a security configuration. The creation and deployment of the configuration may depend on the events and/or conditions that arose to activate the trigger 220, or may depend on the type of trigger 220. A configuration may then be applied 438 to one or more managed nodes 206.

FIG. 5 is a block diagram that illustrates another configuration of a system 500 for securing data. The system 500 may include an administrative system 502, a network 504, and a managed node 506. Although FIG. 5 only illustrates one managed node 506 in the system 500, many additional managed nodes 506 may be connected to the administrative system 502 through a network 504. The network 504 may be a public network, i.e., a network outside of a company or corporation (e.g., the Internet).

The administrative system 502 may include a management application 508, which may include a data security server module 518. Alternatively, the administrative system 502 may not include a management application 508, but may include the data security server module 518. The managed node 506 may include a management agent 516, which may include a data security client module 526. Alternatively, the managed node 506 may not include a management agent 516, but may operate with a data security client module 526.

The data security server module 518 may include triggers 520a, a configuration module 522a, a file identification/searching module 524a, and/or status data/messages 548a. The data security client module 526 may also include triggers 520b, a configuration module 522b, a file identification/searching module 524b, and/or status data/messages 548b. The triggers 520, configuration module 522, file identification/searching module 524, and status data/messages 548 may exist only on the data security server module 518, only on the data security client module 526, or on both (as shown).

The data security server module 518 may apply configurations 542 to a managed node 506, or may otherwise activate configurations 542 for a managed node 506. The data security client module 526 may apply configurations 542 to a managed node 506, or may otherwise activate configurations 542 for a managed node 506.

The administrative system 502 and/or its components may communicate and/or interact with a managed node 506 and/or its components over a network 504. Such interaction may occur in response to conditions and/or events occurring on the administrative system 502, managed node 506, or in response to user interaction on the administrative system 502 and/or managed node 506.

The triggers 520 may detect conditions and/or events occurring on the managed nodes 506 and/or the administrative system 502 and may activate other software in response. The triggers 520 may also activate other software in response to user interaction on the administrative system 502 and/or the managed nodes 506. The triggers 520 may activate each other, the configuration modules 522, the file identification/searching modules 524, and/or the status data/messages 548. The triggers 520 may activate the data security server module 518 and/or data security client module 526 such that a configuration may be applied to or activated on a managed node 506.

There may be triggers 520 for a wide variety of events and/or conditions. For example, there may be a trigger 540a for the situation where an employee is terminated or will be terminated. There may be triggers 540b-f for detecting a virus, a Trojan horse, adware, spyware, and/or a worm, respectively, on the administrative system 502 and/or managed nodes 506. There may be triggers 540g-j for detecting defective software, unapproved software, a network/system breach, and/or unwanted media (e.g., videos, images, games, pornography), respectively, on the administrative system 502 and/or managed nodes 506. There may be triggers 520 for any other automated or manual condition or event besides those illustrated. The triggers 520 may execute their functions locally and/or remotely.

The configuration modules 522 may create and deploy configurations 542. The configurations 542 may be data (e.g., a file, set of instructions, or computer code) designed to configure one or more managed nodes 506. The configurations 542 may include data and/or instructions regarding settings, permissions, accessibility, and/or functionality applicable to one or more managed nodes 506. For example, a configuration 542 may include file settings 544a, directory settings 544b, function settings 544c, port/device settings 544d, user permissions 544e, application settings 544f, etc. File settings 544a may affect a user's ability to open, modify, save, delete, transfer, copy, paste, encrypt, or otherwise act on one or more files 552. As an example, a secure configuration 542 may include file settings 544a that allow a user to open a file 552, but deny modifying, saving, deleting, transferring, copying, pasting, and/or encrypting the file 552. The same configuration 542 may include directory settings 544b that may prevent a user from accessing the directory where the file 552 is located. The same configuration 542 may include function settings 544c that deny screenshot and/or copy/paste functionality. The same configuration 542 may include port/device settings 544d that deny the user access to internal/external devices. That is, the user may not be able to access and/or write a file 552 to a USB drive, SD card, or transfer said file 552 via a network card or other port. The same configuration 542 may include user permissions 544e that deny the user the ability to access or modify a managed node's files 552 or settings. The same configuration 542 may include application settings 544f that deny a user the ability to open certain applications or may deny certain application functionality (e.g. modify, copy/paste text in Microsoft Word®). Other settings or permissions may be utilized other than those examples shown here.

Configuration modules 522 may assist a user in creating and/or deploying configurations 542. Configuration modules 522 may automatically create and/or deploy configurations 542. Configuration modules 522 may store configurations 542. Configuration modules 522 may create and/or deploy configurations 542 in response to triggers 520. Configuration modules 522 may create and/or deploy configurations 542 based on the type of triggers 520 received, the timing of the triggers 520 received, the identity of the managed node's 506 user, the criticality/sensitivity of the data involved, user preference and/or other conditions.

A file identification/searching module 524 may search for and determine critical or sensitive data on managed nodes 506. A file identification/searching module 524 may include file data 546a and/or file identifiers 546b. File data 546a may include a data structure containing critical or sensitive files stored on managed nodes 506. For example, file data 546a may include file names, dates of creation, memory addresses, etc. File identifiers 546b may include information to distinguish critical/sensitive files from other files. For example, file identifiers 546b may include a creation/modification date range, an author name/identifier, a creating machine, a memory address range, sensitive data (e.g., text, images) that a file 552 may include (e.g., whether or not a file includes data at all, whether a file includes certain words in a predetermined frequency, certain names, etc.), or whether a particular file is of a certain class, whether a file has a certain identifier tag, etc. A file identification/searching module 524 may search the storage 550 of managed nodes 506 for, or maintain a list of, files 552 or other data that may be critical or sensitive. A file identification/searching module 524 may execute its functionality at any time. A file identification/searching module 524 may interact with other modules to create/modify triggers 520, create/deploy configurations 542, and/or apply/activate configurations 542.

Status messages 548 may be used to track the status of one or more managed nodes 506. For example, when a trigger 520 detects an event that warrants securing data on a managed node 506, a secure configuration 542 may be activated or applied, and the managed node 506 may create and send a status message 548 indicating that it is in a secure mode. The administrative system 502 may store the status message 548 or otherwise record the status of the managed node 506. The administrative system 502 may later order the managed node 506 to return to its previous status. Once this is accomplished, the managed node 506 may create and send another status message 548 indicating a return to its previous status. The administrative system 502 may update and store the current status of the managed node 506.

The managed nodes 506 may also include data storage 550. The data storage 550 may include files 552. Files 552 may include critical, sensitive, non-critical, and/or non-sensitive files. The file identification/searching modules 524 may determine which of the files 552 are critical, sensitive, non-critical, and/or non-sensitive.

FIG. 6 is a flow diagram that illustrates another configuration of a method 600 for securing data. A secure configuration 542 may be created and deployed 654 to managed nodes 506. Managed nodes 506 may be monitored 656 for conditions or events to arise that may trigger data security.

When a condition or event arises that may compromise sensitive data, or when it may be otherwise desirable to secure managed node data, the secure configuration 542 may be activated or applied to one or more managed nodes 506. Once the configuration 542 is applied or activated 658, a managed node 506 may create and send a status message 548 to an administrative system 502, where the status may be recorded 660. The administrative system 502 may then await 662 a secure status release. As long as the secure status is not released (e.g., an administrator does not trigger a release, or an event does not occur to release the status), then the administrative system 502 may maintain the secure configuration 542. When some event occurs to trigger a release (e.g., a predetermined amount of time has passed or an administrator determines that the secure configuration is no longer necessary or desired), then the secure configuration may be released 664 (e.g., the secure configuration is rolled back, or another configuration is applied). At this point, the managed node 506 may create and send a normal status message, which may be recorded 666 by the administrative system 502 or may cause an update in status.

Figure 7:
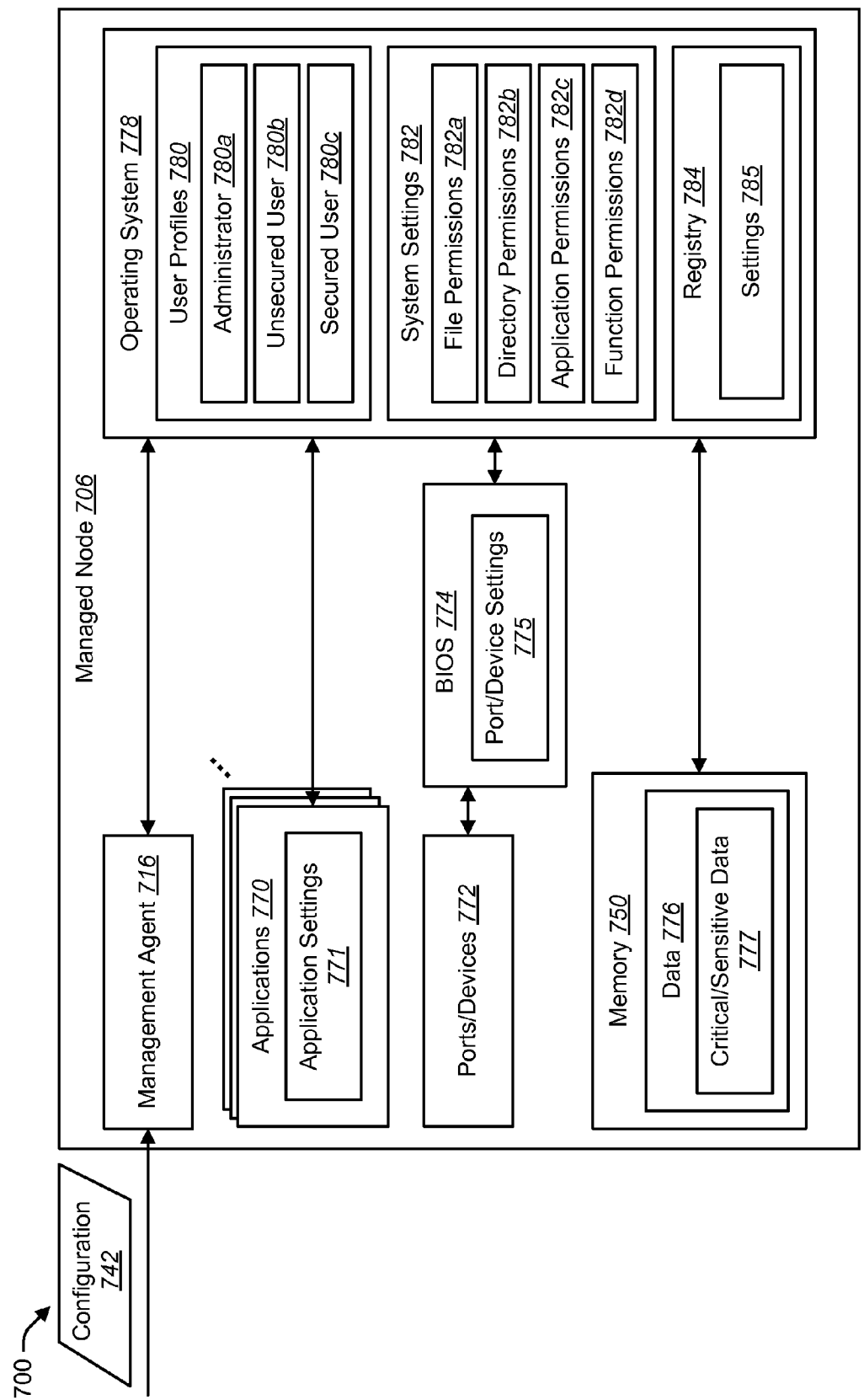
FIG. 7 is a block diagram that illustrates one configuration of a managed node in which a system for securing data may be implemented.

FIG. 7 is a block diagram that illustrates one configuration of components for a managed node 706 where a system 700 for securing data may be implemented. The managed node 706 may include a management agent 716, applications 770, ports/devices 772, Basic Input/Output System (BIOS) 774, memory 750, and an Operating System (OS) 778.

The management agent 716 may be a software application designed to detect certain conditions or events, create and/or deploy configurations 742, search for and/or identify critical/sensitive data, send status data/messages, and/or apply or activate configurations 742. The management agent 716 may receive a configuration 742 and/or apply it to or activate it for the managed node 706. A configuration 742 may include data and/or instructions regarding the applications 770, BIOS 774, ports/devices 772, memory 750, and/or operating system 778. The management agent 716 may manage the managed node 706 independently or in conjunction with an administrative system on a network.

The OS 778 may include user profiles 780, system settings 782, and/or a registry 784. The user profiles 780 may be collections of settings, permissions, etc. that may be assigned to particular users or user groups. Though only three examples are shown here for simplicity, many other user types with varied settings/permissions may exist. User profiles 780 may include an administrator profile 780a, an unsecured user profile 780b, and a secured user profile 780c. For example, as defined by the administrator profile 780a, an administrator may have unlimited permissions including the ability to make significant system changes (e.g., add more users, delete users, change user permissions, modify system settings, install software, modify files, move files, delete files, encrypt files, copy files, transfer files, access any data/directory/file, configure/install hardware, etc.). As defined by the unsecured user profile 780b, an unsecured user may have significant, but limited permissions. For example, an unsecured user may be able to delete, create, modify, move, transfer, and copy files, and may have other limited permissions to modify settings. However, the unsecured user may not have permission to install new software, change user accounts, change user permissions, etc. As defined by the secured user profile 780c, a secured user may have no permissions or extremely limited permissions. For example, a secured user may only have the ability to view or open files. However, a secured user may not be able to modify, copy, delete, or transfer files in any way. The secured user may not be able to transfer or copy files to another memory medium, memory location, or network location. The secured user may not be able to modify any system settings whatsoever. While not necessarily being locked out of the machine, the secured user may only have minimal permissions.

The system settings 782 may include settings that may affect functionality of the managed node 706. System settings 782 may include system-wide functions. For example, system settings 782 may include settings 782a for file permissions, settings 782b for directory permissions, settings 782c for application permissions, and/or settings 782d for function permissions. File permissions may include the system's ability to allow file copying, renaming, moving, transferring, encrypting, deleting, creating, and hiding functions, etc. Directory permissions may include the system's ability to allow access to certain directories or user access to the directory tree. Settings 782c for application permissions may include the system's ability to allow any given application to be installed or utilized on the system. For example, application permissions might be configured to disallow a user from utilizing Microsoft Word® or installing a new browser, etc. Or, application permissions may be configured to disallow certain application functionality. Settings 782d for function permissions may include the system's ability to allow certain functions. For example, settings 782d for function permissions might be configured to disallow system copy/paste or screenshot functionality. System settings 782 may also include which types of devices may be used in conjunction with the managed node 706.

The registry 784 may include settings 785. Settings 785 may include or reflect settings for: the OS 778 or its components, software/applications, ports/devices, BIOS 774, and/or memory 750, etc. In fact, registry settings 785 may include some or all settings for many system components (e.g., user profiles 780, system settings 782, application settings 771, port/device settings 775). These settings 785 may control the behavior of some or all components in the managed node 706. Adjusting the registry settings 785 may affect whether an application can perform certain functions or even whether it is operable. The registry settings 785 may affect the functionality of certain ports/devices 772. For example, registry settings 785 may be used to disable the write functionality on a CD/DVD drive, disable the operability of a USB port, or even disallow access to system memory 750.

The applications 770 may be software applications installed on the managed node 706. The applications 770 may include application settings 771. Application settings 771 may include a wide range of application permissions, options, and preferences. Adjusting application settings 771 may disable certain application functions. For example, applications settings 771 may be adjusted to only allow file viewing capability.

The BIOS 774 may include hardware and/or software to interface with managed node ports and/or devices 772. The BIOS 774 may include port/device settings 775. The port/device settings may affect which ports and/or devices 772 may be used in conjunction with the managed node 706, and/or what functions they may perform. For example, the port/device settings 775 may be used to allow data from a CD/DVD drive to be read, but may disallow data writing to the drive. Further, the port/device settings 775 may disallow or filter the transfer of data through an Ethernet port. Further, the port/device settings 775 may disallow a video card from outputting certain visual data.

Ports/devices 772 may comprise internal and/or external ports/devices. For example, a managed node 706 may include USB ports, fiber optic ports, Infrared (IR) ports, Personal Computer Memory Card International Association (PCMCIA) ports, Secure Digital (SD) Card ports, Peripheral Component Interconnect (PCI) ports, Ethernet ports, video ports (e.g. component video, composite video, S-video), audio ports, as well as ports for Compact Disc (CD)/Digital Video Disc (DVD) drives, hard drives, floppy disk drives, flash drives, etc. A managed node 706, for example, may also include hard drives, CD/DVD drives, a video card, audio card, monitors, and/or speakers.

The memory 750 may include managed node data 776, which may include critical or sensitive data 777. Data 776 and/or critical or sensitive data 777 may comprise files.

As mentioned earlier, a management agent 716 may receive and apply or activate a configuration 742. The management agent 716 may work in conjunction with the OS 778, applications 770, BIOS 774, and memory 750 in order to secure critical/sensitive data 777. For example, the management agent 716 may change (or direct to be changed) user profiles 780, system settings 782, the registry 784 (and/or its settings 785), application settings 771, port/device settings 775, and/or memory 750. The management agent 716 may execute instructions included in the configuration 742. The management agent 716 may also may interpret data included in the configuration 742, and/or use it to change managed node settings. For example, the management agent 716 may receive a configuration 742 and apply it to the managed node 706. In doing so, the management agent 716 may assign a different user profile 780 to a current user (e.g., assign a secured user profile 780c to a user that was previously assigned an unsecured user profile 780b). The management agent 716 may further change system settings, for example, by revoking file, directory, application, and/or function permissions (via the file permissions settings 782a, directory permissions settings 782b, application permissions settings 782c, function permissions settings 782d, etc.). The management agent 716 may change registry values/settings 785 in order to disable certain applications or prohibit write access to memory 750 or another device. The management agent 716 may change port/device settings 775, for example, by disabling the ability to utilize certain ports/devices 772, such as disabling write access to a removable memory device (e.g., USB drive, SD card) or transfer access to a port 772 (e.g., and/or disable an Ethernet, USB, or fiber optic port). The management agent 716 may even change port/device settings 775 to disallow certain peripheral (e.g., mouse, keyboard, touch screen) signals from being received (e.g., disallow mouse right-click, or ignore a keyboard function). The management agent 716 may otherwise use software to intercept prohibited commands and/or disable system functionality. In so doing, the management agent 716 may effectively prevent a user from destroying, modifying, copying, transferring, encrypting, or otherwise compromising critical/sensitive data 777.

Figure 8:
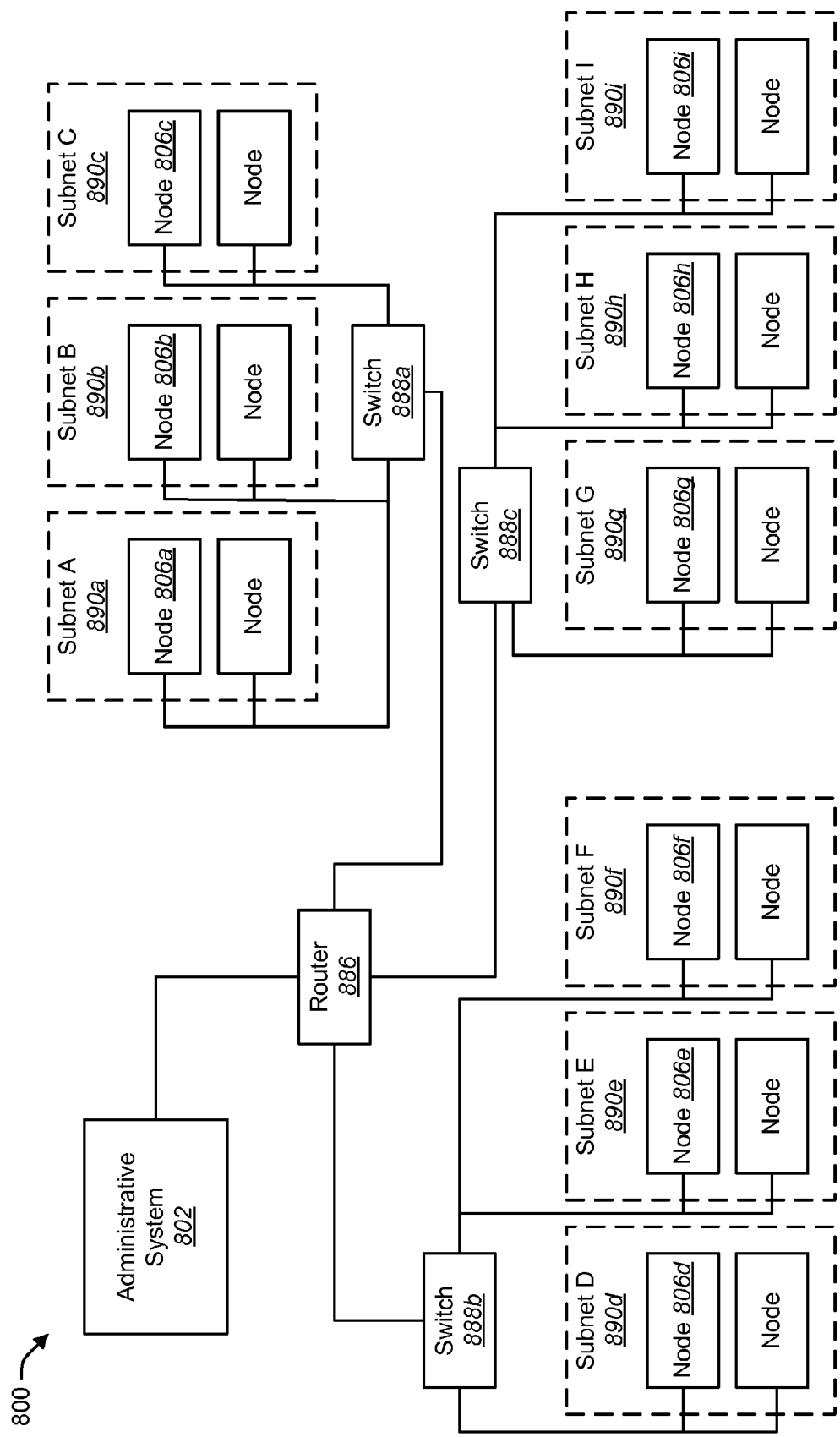
FIG. 8 is a block diagram that illustrates one configuration of a network in which a system for securing data may be implemented.

FIG. 8 is a block diagram that illustrates one configuration of a network 800 where a system for securing data may be implemented. An administrative system 802 is connected to a router 886. The router 886 is connected to switches 888a, 888b, 888c. The switch 888a is connected to several nodes 806a, 806b, 806c, etc. via their respective subnets 890a, 890b, 890c. The switch 888b is connected to several nodes 806d, 806e, 806f, etc. via their respective subnets 890d, 890e, 890f. The switch 888c is connected to several nodes 806g, 806h, 806i, etc. via their respective subnets 890g, 890h, 890i. Although FIG. 8 only shows one router 886, and a limited number of switches 888, subnets 890, and nodes 806, many and varied numbers of routers 886, switches 888, subnets 890, and nodes 806 may be included in networks and/or systems where a system for securing data may be implemented.

Figure 9:
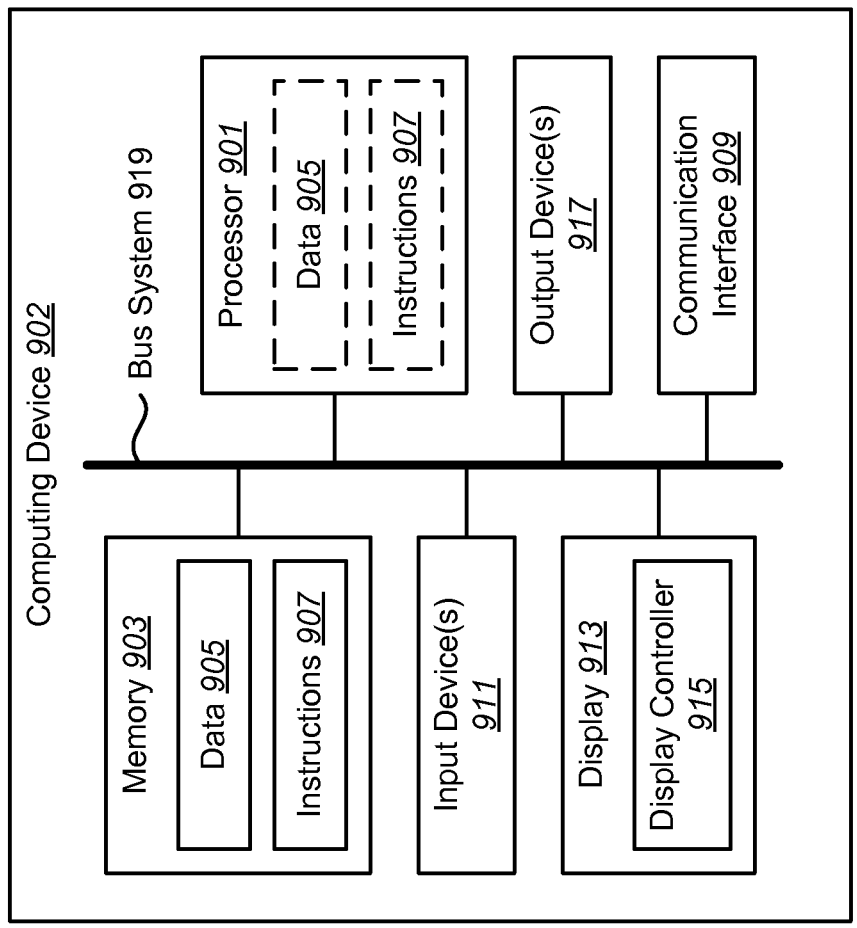
FIG. 9 is a block diagram that illustrates various components of a computing device.

FIG. 9 illustrates certain components that may be included within a computing device 902. The computing device 902 may be an administrative system or a managed node. The computing device 902 includes a processor 901. The processor 901 may be a general purpose single- or multi-chip microprocessor (e.g., an ARM), a special purpose microprocessor (e.g., a digital signal processor (DSP)), a microcontroller, a programmable gate array, etc. The processor 901 may be referred to as a central processing unit (CPU). Although just a single processor 901 is shown in the computing device 902 of FIG. 9, in an alternative configuration, a combination of processors (e.g., an ARM and DSP) could be used.

The computing device 902 also includes memory 903. The memory 903 may be any electronic component capable of storing electronic information. The memory 903 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 905 and instructions 907 may be stored in the memory 903. The instructions 907 may be executable by the processor 901 to implement methods disclosed herein. Executing the instructions 907 may involve the use of the data 905 that is stored in the memory 903.

The computing device 902 may also include one or more communication interfaces 909 for communicating with other computing devices. Communication with other computing devices may occur directly and/or via a computer network. A communication interface 909 may include one or more communication ports, such as Ethernet ports, Universal Serial Bus (USB) ports, parallel ports, serial ports, etc.

The computing device 902 may also include one or more input devices 911. Examples of input devices 911 include a keyboard, mouse, touch-screen display, remote control device, microphone, button, joystick, trackball, touchpad, light-pen, etc.

The computing device 902 may also include a display 913. A display controller 915 may also be provided, for converting data 905 stored in the memory 903 into text, graphics, and/or moving images (as appropriate) shown on the display 913. One or more other output devices 917, such as audio speakers, may also be included in the computing device 902.

The various components of the computing device 902 may be coupled together by one or more buses, which may include a power bus, a control signal bus, a status signal bus, a data bus, etc. For the sake of clarity, the various buses are illustrated in FIG. 9 as a bus system 919.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for securing data on a managed device, the method being performed by an administrative system that is connected to a managed device over a network, comprising:
   detecting, by the administrative system, an event related to the managed device that triggers application of a secure configuration, wherein the event comprises determining that a user of the managed device is an employee whose employment has been or will be terminated;
   in response to detecting the event, searching the data on the managed device and determining whether the data is sensitive without any prior knowledge of the data and dynamically creating, by the administrative system, the secure configuration based on the event;
   wherein the secure configuration, when applied, disables functionality of the managed device that compromises sensitive data but does not prevent all user access to the managed device, wherein the secure configuration, when applied, restricts functionality of the managed device to read-only while allowing writes initiated by an operating system to a memory page file, wherein the functionality of the managed device that is disabled by the secure configuration comprises formatting a disk, encrypting the disk, copying files via system ports, and taking screenshots;
   deploying, by the administrative system, the secure configuration to the managed device;
   causing, by the administrative system, the secure configuration to be applied to the managed device;
   in response to the secure configuration being applied to the managed device, receiving by the administrative system, a status message from the managed device indicating that the managed device is in a secure mode that allows the user of the managed device to at least view files on the managed device; and
   wherein the administrative system waits to detect an event that indicates that the secure configuration is no longer necessary, causing the secure configuration to be released from the managed device and the managed device to send to the administrative system a normal status message.

2. The method of claim 1, wherein the functionality of the managed device that is disabled by the secure configuration further comprises at least one of modifying, deleting, renaming, transferring, and copying the sensitive data.

3. The method of claim 1, wherein the secure configuration changes settings of the managed device when the secure configuration is applied to the managed device, and wherein the settings comprise at least one of file settings, directory settings, function settings, port settings, device settings, and application settings.

4. The method of claim 1, wherein the secure configuration changes user permissions of the managed device when the secure configuration is applied to the managed device.

5. The method of claim 1, wherein causing the secure configuration to be applied to the managed device comprises instructing the managed device to apply the secure configuration.

6. The method of claim 1, wherein causing the secure configuration to be applied to the managed device is performed automatically in response to detecting the event.

7. The method of claim 1, wherein causing the secure configuration to be applied to the managed device is performed manually in response to user input.

8. The method of claim 1, wherein the secure configuration is deployed to the managed device before another event is detected that makes securing the data on the managed device desirable.

9. The method of claim 1, wherein the secure configuration is deployed to the managed device after another event is detected that makes securing the data on the managed device desirable.

10. An administrative system that is configured for securing data on a managed device connected to the administrative system over a network, the administrative system comprising:
    a processor;
    memory in electronic communication with the processor;
    instructions stored in the memory, the instructions being executable to:
    detect an event related to the managed device that triggers application of a secure configuration, wherein the event comprises determining that a user of the managed device is an employee whose employment has been or will be terminated;
    in response to detecting the event, search the data on the managed device and determine whether the data is sensitive without any prior knowledge of the data, wherein the administrative system dynamically creates the secure configuration based on the event;
    wherein the secure configuration, when applied, disables functionality of the managed device that compromises sensitive data but does not prevent all user access to the managed device, wherein the secure configuration, when applied, restricts functionality of the managed device to read-only while allowing writes initiated by an operating system to a memory page file, wherein the functionality of the managed device that is disabled by the secure configuration comprises formatting a disk, encrypting the disk, copying files via system ports, and taking screenshots;

deploy, by the administrative system, the secure configuration to the managed device;

cause the secure configuration to be applied to the managed device;

in response to the secure configuration being applied to the managed device, receive by the administrative system, a status message from the managed device indicating that the managed device is in a secure mode that allows the user of the managed device to at least view files on the managed device; and wherein the administrative system waits to detect an event that indicates that the secure configuration is no longer necessary, causing the secure configuration to be released from the managed device and the managed device to send to the administrative system a normal status message.

11. The administrative system of claim 10, wherein the functionality of the managed device that is disabled by the secure configuration further comprises at least one of modifying, deleting, renaming, transferring, and copying the sensitive data.

12. The administrative system of claim 10, wherein the secure configuration changes settings of the managed device when the secure configuration is applied to the managed device, and wherein the settings comprise at least one of file settings, directory settings, function settings, port settings, device settings, and application settings.

13. The administrative system of claim 10, wherein the secure configuration changes user permissions of the managed device when the secure configuration is applied to the managed device.

14. A non-transitory computer-readable medium for securing data on a managed device connected to an administrative system over a network, the computer-readable medium comprising executable instructions for:

detecting an event related to the managed device that triggers application of a secure configuration, wherein the event comprises determining that a user of the managed device is an employee whose employment has been or will be terminated;

in response to detecting the event, searching the data on the managed device and determining whether the data is sensitive without any prior knowledge of the data and dynamically creating, by the administrative system, the secure configuration based on the event;

wherein the secure configuration, when applied, disables functionality of the managed device that compromises sensitive data but does not prevent all user access to the managed device, wherein the secure configuration, when applied, restricts functionality of the managed device to read-only while allowing writes initiated by an operating system to a memory page file, wherein the functionality of the managed device that is disabled by the secure configuration comprises formatting a disk, encrypting the disk, copying files via system ports, and taking screenshots;

deploying, by the administrative system, the secure configuration to the managed device;

causing the secure configuration to be applied to the managed device;

in response to the secure configuration being applied to the managed device, receiving by the administrative system, a status message from the managed device indicating that the managed device is in a secure mode that allows the user of the managed device to at least view files on the managed device; and wherein the administrative system waits to detect an event that indicates that the secure configuration is no longer necessary, causing the secure configuration to be released from the managed device and the managed device to send to the administrative system a normal status message.

\* \* \* \* \*